United States Patent [19]

Brouard et al.

[11] 3,878,158

[45] Apr. 15, 1975

[54] PROCESS FOR THE COLOURATING IN BULK OF SYNTHETIC POLYAMIDES

[75] Inventors: Claude Marie Henri Emile Brouard, Sotteville Les Rouen; Paulette Gisele Ficht, Mont Saint Aignan, both of France

[73] Assignee: Produits Chimiques Ugine Kuhlmann, Paris, France

[22] Filed: Feb. 25, 1974

[21] Appl. No.: 445,184

[30] Foreign Application Priority Data
  Mar. 2, 1973  France .............................. 73.07457

[52] U.S. Cl. ............ 260/37 N; 260/37 NP; 260/147
[51] Int. Cl. .............................................. C08g 51/14
[58] Field of Search ............... 260/37 N, 145 R, 147

[56] References Cited
UNITED STATES PATENTS

| | | | |
|---|---|---|---|
| 3,375,240 | 3/1968 | Beffa et al. .................... | 260/37 N X |
| 3,412,081 | 11/1968 | Achermann .................. | 260/37 N X |
| 3,426,008 | 2/1969 | Meininger et al. ............ | 260/37 N X |
| 3,728,328 | 4/1973 | Lienhard et al. .............. | 260/147 |

FOREIGN PATENTS OR APPLICATIONS 1,213,989  5/1964  Germany .......................... 260/37 N

*Primary Examiner*—Lewis T. Jacobs
*Attorney, Agent, or Firm*—Browne, Beveridge, DeGrandi & Kline

[57] ABSTRACT

Process for the dyeing in bulk of fibres based on synthetic polyamides in which the dyeing is effected by means of a monoazo chromiferous complex dyestuff of the formula:

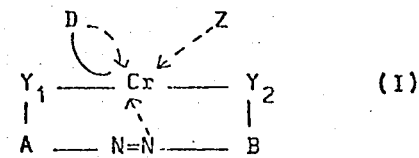

wherein A represents the residue of a diazotisable amine, B represents the residue of a coupling compound, the residue A or B carrying a sulphonic group, $Y_1$ represents —O— or

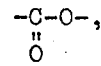

$Y_2$ represents —O— or

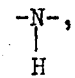

D represents the residue of a bidentate chelating agent, $Y_1$ and $Y_2$ are respectively in a vicinal position with respect to the group —N=N—, and Z represents a monofunctional neutral ligand; process for the preparation of such dyestuffs; process for the dyeing or printing of natural or synthetic polyamides in which the colouring agent is such a dyestuff, and natural or synthetic polyamides dyed or printed by means of such dyestuffs.

8 Claims, No Drawings

PROCESS FOR THE COLOURATING IN BULK OF SYNTHETIC POLYAMIDES

The present invention relates to a process of dyeing in bulk of fibres based on synthetic polyamides.

According to the present invention a process of dyeing in bulk of fibres based on synthetic polyamide is provided in which a monoazo complex chromiferous dyestuff of the general formula:

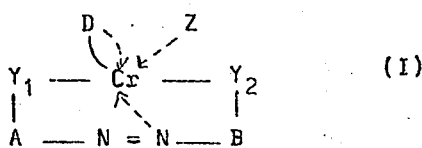

wherein A represents the residue of a diazotisable amine, B represents the residue of a coupling compound, the residues A or B carrying a sulphonic group, $Y_1$ represents —O— or

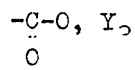

$Y_2$ represents —O— or

D represents the residue of a bidentate chelating agent and Z represents a monofunctional neutral ligand.

According to a preferred form of the invention, the dyestuff (I) does not contain a nitro group.

The bidentate chelating agent corresponding to the residue D may be, for example, a β-diketone, an acetoacetanilide, an O-hydroxyaldehyde, an O-nitrosophenol or -naphthol or a peri hydroxyquinone. The β-diketones and especially acetylacetone are the preferred chelating agent.

The bidentate chelating agents are substances capable of being linked to the chromium by a covalent bond and a coordinate bond in forming with the chromium atom a five- or six-membered ring.

The monofunctional ligand Z may be a molecule of water, ammonia or an organic base.

The groups $Y_1$ and $Y_2$ occupy respectively the vicinal position with regard to the group —N=N—.

By "vicinal position" is meant not only the ortho position, but possibly also the alpha or peri position.

The complex dyestuffs of formula (I) may, for example, be prepared as follows: a bidentate chelating agent as defined above is reacted with a 1:1 chromium complex of a dyestuff of the general formula:

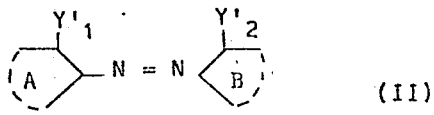

in the presence of water, ammonia, or a mineral or organic base or a mixture of these ligands, A and B being as defined above, $Y'_1$ representing a hydroxy, methoxy or carboxy group and $Y'_2$ representing a hydroxy or amino group, $Y'_1$ and $Y'_2$ being respectively in a vicinal position with respect to the group —N=N—. The reaction is carried out in aqueous medium, and preferably in alkaline medium, and is generally operated at a temperature of from 20°C. to 100°C. The yields are generally excellent.

A large number of dyestuffs of the formula (II) are already known of themselves, as well as their 1:1 chromium complex, to which may be attributed a structure corresponding to the general formula:

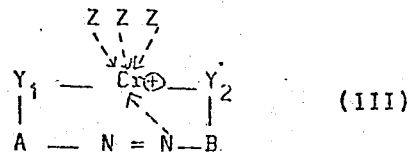

in which A, B, $Y_1$, $Y_2$ and Z have the significance already defined above.

The dyestuffs of formula (III) may easily be obtained for example by heating a dyestuff of formula (II) with a trivalent chromium salt such as, for example, chromic chloride or basic chromium sulphate in aqueous medium at from 90°C. to 150°C.

The dyestuffs of formula (I) are distinguished from the starting 1:1 complexes by their very different and very valuable tinctorial properties, in particular in the colouration of natural or synthetic polyamides. In fact, it is known that the 1:1 complexes of chromium are only able to colour the natural or synthetic polyamides in a strongly acid bath i.e., having a pH below 4 (generally sulphuric acid), and this causes the fibres to deteriorate and modifies their handle (Synthetic dyes by Venkataraman, Volume III, p. 305). The dyestuffs of formula (I) have the advantage of being able to dye synthetic polyamides in a neutral to weakly acid i.e., having a pH of 4 or above medium and consequently permit one to make the most of the properties of the fibres.

Further, the brilliancy of the shades is most frequently superior to that of the initial 1:1 chromium complexes, and the exhaustion of the bath and tinctorial yields are good, even excellent. The fastness to wet tests and to light are excellent.

Further, the dyestuffs of formula (I), especially those not containing a nitro group, when used in the process of this invention show a particularly good heat stability and this is an important advantage. This remarkable stability to heat makes their application to the bulk dyeing of the fibres based on polyamides particularly favourable.

The dyeing in bulk according to the invention may be carried out for example by introducing the dyestuff (I), into the spinning mass, or the granules of polyamides are dyed by means of the dyestuff (I), then the polymer thus dyed is melted and extruded.

The invention also relates to synthetic fibres based on polyamides dyed in bulk according to the new process.

The invention is illustrated by the following Examples in which the parts are parts by weight.

(A) PREPARATION OF THE DYESTUFFS OF FORMULA (I)

EXAMPLE A-1

52.8 parts of the 1:1 chromium complex of the monoazo dyestuff [4-sulpho-2-hydroxy-naphthalene] < 1 azo 4 > [1-phenyl-3-methyl-5-pyrazolone] in 1,000 parts of water are heated to 70°C. 14 parts of acetylacetone and 35 parts of pyridine are added and the mixture is maintained for 2 hours at 75°C. The end of the condensation is checked by chromatography, then the dyestuff is salted out with sodium chloride, filtered off and dried. The yield is practically quantitative.

Analysis enables the following formula to be attributed to the dyestuff:

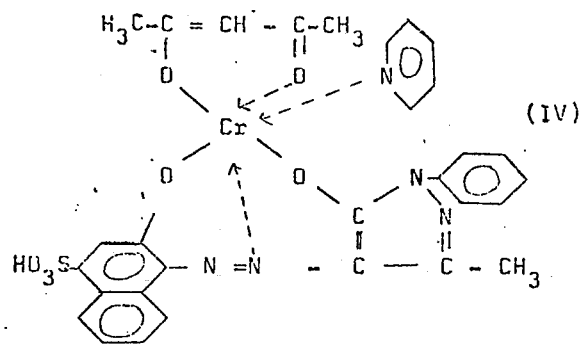

It dyes polyamides in a bluish red shade of good general fastness.

In this example, the pyridine may be replaced by 13.4 parts of 25 percent ammonia and in this case, the molecule of ammonia replaces the molecule of pyridine. The pyridine may also be replaced by 15 parts of 30 percent by weight of soda lye, in which case the molecule of water replaces that of pyridine in the formula (IV) above. Whether pyridine, ammonia or water is taken as the ligand Z, it is found that in the three cases the shade and the fastness obtained are the same.

EXAMPLE A-2

50.6 parts of the 1:1 complex of chromium of the monoazo dyestuff [2-carboxy-benzene] < 1 azo 4 > [1-(4'-sulpho-) phenyl-3-methyl-5-pyrazolone] in 150 parts of water are heated to 90°C. 14 parts of acetylacetone and 35 parts of pyridine are added, and the heating is maintained for 2 hours. After cooling, the dyestuff is filtered off, then dried, the yield being practically quantitative. It dyes polyamides in a yellow shade of good general fastness.

EXAMPLES A-3 to A-17

On operating in an analogous manner to that described in Examples 1 and 2 there are obtained, starting from the 1/1 chromium complexes of the monoazo dyestuffs of which the diazotisation compounds and the coupling compounds are indicated in columns II and III of the following Table, the shades on polyamides which are given in column IV.

| I Example | II Diazotisation compound | III Coupling compound | IV Shade |
|---|---|---|---|
| 3 | anthranilic acid | 1-(3'-sulpho)phenyl-3-methyl-5-pyrazolone | yellow |
| 4 | " | 1-(5'-sulpho-2'-chloro)phenyl-3-methyl-5-pyrazolone | yellow |
| 5 | " | 1-(2'-ethyl)phenyl-3-methyl-5-pyrazolone | yellow |
| 6 | 5-sulpho-anthranilic acid | 1-(3'-chloro)phenyl-3-methyl-5-pyrazolone | yellow |
| 7 | " | 1-(4'-chloro)phenyl-3-methyl-5-pyrazolone | yellow |
| 8 | 3,5-dichloro-anthranilic acid | 1-(4'-sulpho)phenyl-3-methyl-5-pyrazolone | yellow |
| 9 | " | 1-(3'-sulpho)phenyl-3-methyl-5-pyrazolone | yellow |
| 10 | 4-chloro-2-amino-phenol | 1-(4'-sulpho)phenyl-3-methyl-5-pyrazolone | red |
| 11 | " | 1-(3'-sulpho)phenyl-3-methyl-5-pyrazolone | red |
| 12 | 4,6-dichloro-2-amino-phenol | 1-(4'-sulpho)phenyl-3-methyl-5-pyrazolone | red |
| 13 | " | 1-(3'-sulpho)phenyl-3-methyl-5-pyrazolone | red |
| 14 | 4-chloro-6-sulpho-2-amino-phenol | 2,4-dihydroxy-quinoline | bordeaux |
| 15 | 4-sulpho-1-amino-2-naphthol | alpha-naphthol | blue |
| 16 | 4-sulpho-1-amino-2-naphthol | beta-naphthol | blue |
| 17 | 4-chloro-6-sulpho-2-amino-phenol | 4-methyl-1-naphthol | blue |

EXAMPLE A-18

On operating in an analogous manner to that of Example 1 a blue shade is obtained on polyamide from the 1/1 chromium complex of [4-sulpho-2-hydroxy-naphthalene]- < 1 azo 2 > [4-methyl-1-hydroxy-naphthalene]. For the synthesis of the initial monoazo dyestuff, the diazotisation compound has been 4-sulpho-1-amino-2-naphthol and the coupling compound 4-methyl-1-naphthol.

B. EXAMPLES OF THE PROCESS OF BULK DYEING OF FIBRES BASED ON POLYAMIDES

EXAMPLE B-1

100 parts of polyamide 6,6 (polyadipate of hexamethylenediamine) and 0.5 parts of the complex described in Example A-3 above are mixed for an hour in a cylindrical vessel turning on its axis. This mixture is incorporated in an extruder of which the spinneret is at 285°C. On leaving the spinneret the polymer is cooled, then converted into grains each having 2 mm as its greatest dimension. These grains after an extended drying, are introduced into a spinning apparatus where the melted polymer is subjected to a constant pressure on a fusion grating at 290°C. before passing on a filtering bed based on washed and calcined river sand the grains of which have a dimension of the order of 0.03 mm, then through a spinneret having 7 orifices of 0.23 mm diameter. The regulation of the apparatus is effected so that after a subsequent drawing of coefficient 4 the seven filaments each have a titre of 17 decitex.

This titre is very commonly met with in textile fibres intended for articles of furniture. The filaments are coloured a yellow shade which is very fast to light and to wet tests.

EXAMPLE B-2

1.5 parts of the complex described in Example A-12 above are made into a paste in 7.5 parts of water demineralised at 40°C. and this mixture is introduced into a dyeing apparatus able to function under pressure and already containing 1,000 parts of demineralised water adjusted to a pH of 5 by the addition of acetic acid. Then 300 parts of polyamide-6 in the form of small granules each having about 2 mm as its greatest dimension are added, and the temperature is raised to 103°C. in about 30 minutes. This temperature is maintained for one and a half hours while the preparation is agitated. The dyed granules are then washed with water and dried. When they are then converted into filaments, as described in Example B-1, they have a scarlet colouration of very good fastness to light and to wet tests.

We claim:

1. Process for the dyeing in bulk of fibres based on synthetic polyamides in which the dyeing is effected by means of a monoazo chromiferous complex dyestuff of the formula:

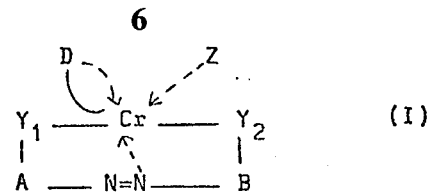

wherein A represents the residue of a diazotisable amine, B represents the residue of a coupling compound, the residues A or B carrying a sulphonic group, $Y_1$ represents —O— or $$-O- \text{ or } -\underset{\underset{O}{\|}}{C}-O-,$$

$Y_2$ represents —O— or $$-\underset{\underset{H}{|}}{N}-,$$

D represents the residue of a bidentate chelating agent, $Y_1$ and $Y_2$ are respectively in a vincinal position with respect to the group —N=N—, and Z represents a monofunctional neutral ligand.

2. Process according to claim 1 wherein the dyestuff is free from nitro groups.

3. Process according to claim 1 in which the bidentate chelating agent corresponding to the residue D is a β-diketone, and acetoacetanilide, an O-hydroxyaldehyde, an O-nitrosophenol or -naphthol or a peri-hydroxyquinone.

4. Process according to claim 1 wherein D represents the residue of acetylacetone.

5. Process according to claim 1 wherein Z represents a molecule of water, ammonia or an organic base.

6. Process according to claim 1 wherein the dyestuff is introduced into a polyamide mass prior to spinning into fibres.

7. Process according to claim 1 wherein granules of the polyamide are dyed with the dyestuff, the dyed granules are melted and then extruded into fibres.

8. Fibres based on synthetic polyamides dyed in bulk according to the process of claim 1.

* * * * *